June 2, 1936.  J. H. BLAIR  2,043,028
DENTAL TOOL ATTACHMENT
Filed Nov. 3, 1933
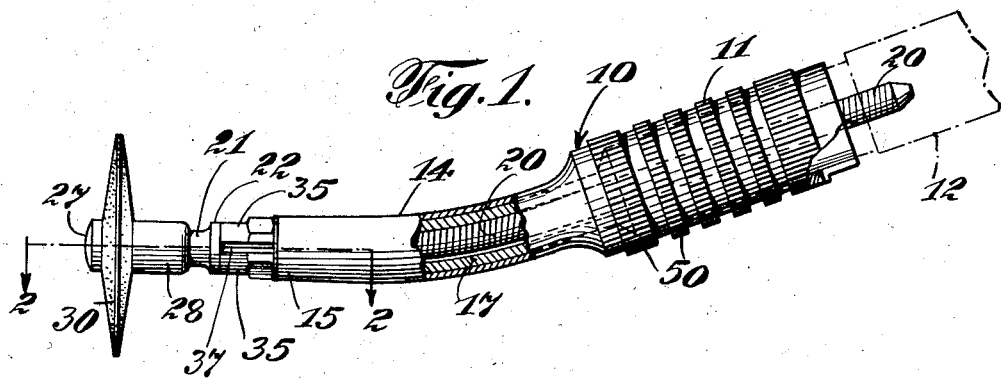
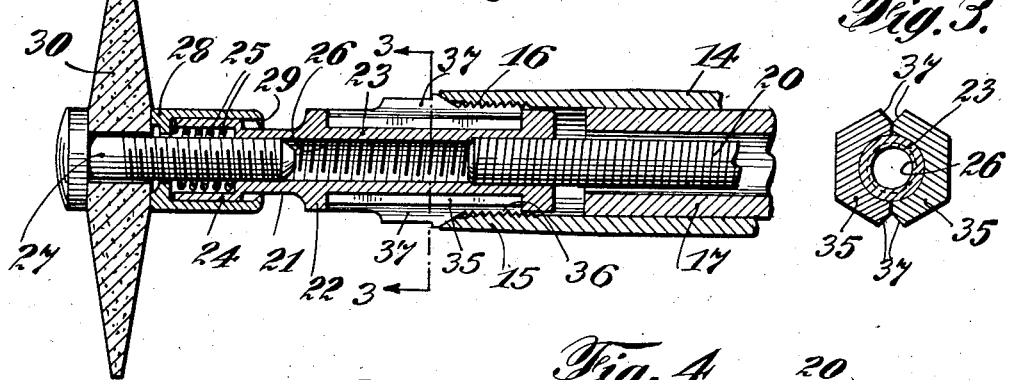
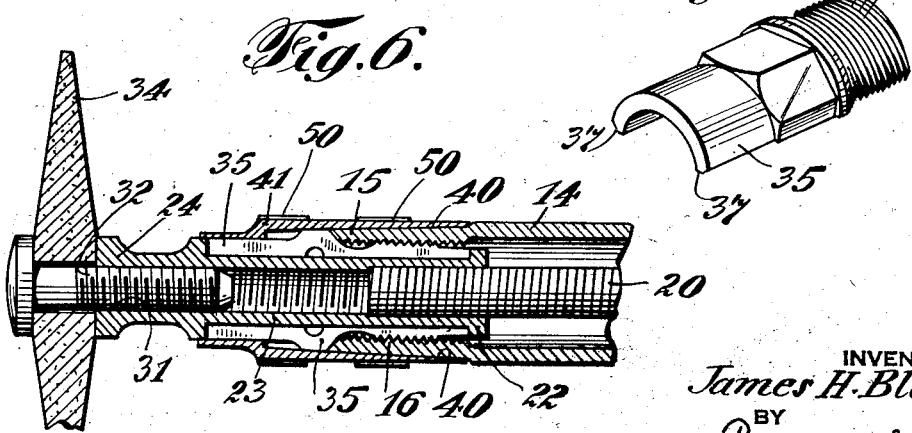
INVENTOR
James H. Blair
BY
Ramsey & Kent
his ATTORNEYS Patented June 2, 1936

2,043,028

UNITED STATES PATENT OFFICE 2,043,028

DENTAL TOOL ATTACHMENT

James H. Blair, Staten Island, N. Y., assignor to Chayes Dental Instrument Corporation, New York, N. Y., a corporation of New York Application November 3, 1933, Serial No. 696,497

2 Claims. (Cl. 32—11)

This invention relates to improvements in dental tools and more particularly to improvements in counter-angle attachments for dental handpieces.

Heretofore use has been made of counter-angle dental handpieces of various types for rendering it possible for a dentist to perform work on the denture of the patient in parts of a mouth not readily accessible. Disadvantages have existed in all types of such attachments. Ordinarily the driving mechanism within the attachment has included gearing for obtaining the angular drive. Such gearing of necessity includes detrimental lost motion with the result that accurate work cannot be performed by the dentist due to chattering, etc.

An object of the present invention is to provide a new, simple and efficient attachment for dental handpieces which is relatively inexpensible to manufacture.

Another object of the invention is to provide an attachment of the character specified in which the angular drive is accomplished through a flexible shaft.

A further object of the invention is to provide new and improved bearings for such shaft.

In overcoming the difficulties inherent in previous attachments of this character, the present invention contemplates the use of an elbow-like member hollowed out for the reception of a flexible drive shaft. This drive shaft has a portion extending beyond one end of the elbow member for the attachment of grinding disks and the like, and another portion extending beyond the other end of the elbow member for attachment in the chuck of a customary dental handpiece.

A part of the interior of the elbow member is provided with a bushing which serves to properly align the flexible shaft and the smaller end of the elbow member is internally threaded for the reception of bearing members peculiar to this invention. The flexible drive shaft has a solid portion at the outer end thereof which is internally threaded for the reception of a screw serving to hold an abrasive disk or other instrument secured to the end thereof. Another portion of this solid member of the drive shaft of uniform diameter is provided with shoulders at each end thereof. This portion of uniform diameter serves as a bearing surface to be enclosed by two bearing members of similar shape and configuration, which when assembled around the shaft form a substantially complete encircling member. These two complementary bearing members are threaded each at one end thereof for screw threaded engagement with the internal threads in the end of the elbow member. If desired, the smaller end of the elbow member can be tapered a slight degree and a sleeve member may be inserted over this tapered portion and over the complementary bearing members to prevent abrasive materials from interfering with the operation of the bearing. The elbow member and the sleeve may be knurled suitably to supply a good grip for the operator.

Other features and advantages of the invention will become apparent by reference to the following detailed description read in the light of the accompanying drawing, wherein Fig. 1 is a view partially in vertical section of an attachment embodying the invention.

Fig. 2 is an enlarged section taken substantially on the line 2—2 of Fig. 1.

Fig. 3 is a section taken substantially on the line 3—3 of Fig. 2.

Fig. 4 is a plan view of a part of the flexible shaft incorporated in the invention.

Fig. 5 is an enlarged perspective view of one of the complementary sections forming the internal member.

Fig. 6 is a view similar to Fig. 2 of a slightly modified form of the invention.

Referring now to the drawing, 10 indicates generally an elbow member of tubular form forming the protective casing for the driving mechanism, such member being provided with a slight bend as shown whereby the user of the instrument can so manipulate the attachment as to be able to operate efficiently in the most inaccessible parts of a patient's mouth. One end of the member 10 is enlarged as at 11 to fit on the end of a dental handpiece 12 of customary character. The other end as at 14 includes the elbow bend and is of such configuration as to taper off slightly to the end thereof. End portion 15 is provided with internal threads 16 as shown in Figures 2 and 6. The interior of the bend part 14 is provided with tubular bushings 17 for a purpose to be explained later.

In conjunction with the elbow casing 10, use is made of a drive shaft which includes a portion 20 made in such fashion as to be flexible and a solid portion 21. Flanges or shoulders 22 extend outwardly from the ends of a part 23 which serves as a bearing surface for the shaft. A head 24 is at the end of the solid portion 21.

This head 24 may be constructed in the fashion shown in Fig. 2 or in the fashion shown in Fig. 6. In the construction shown in Fig. 2, the arrangement corresponds to the mandrel arrangement disclosed in my copending application Serial No. 661,895, filed March 21, 1933. In this construction the head 24 is hollowed-out for the reception of a coiled spring 25. A part of the solid portion 21 of the shaft is internally threaded as at 26 for the reception of a screw 27. A hollowed-out sleeve 28 fits around the head 24 and has its end spun inwardly as at 29 to lock the same on the head. The spring 25 serves to force the sleeve 28 out normally until the tension of the screw 27 in fastening a disk 30 in place tightens the sleeve 28 down against the end of the head 24. Inasmuch as this construction is described and claimed in the copending application referred to above, the detailed operation thereof is not included herewith.

In the arrangement shown in Fig. 6, the head 24 is simply internally threaded as at 31 for the reception of a headed screw 32, which when threaded in place serves to lock a grinding disk 34 in place.

The bearing members contacting with the bearing surface 23 comprise two complementary sections 35 in the nature of halves of a tube. One end of each section 35 is threaded as at 36 for engagement with the threads 16 in the end of the elbow casing. If desired a part of the peripheral surface of each section 35 may be shaped in such fashion that when these two sections surround the bearing surface 23, a hexagon will be formed for engagement with a suitable wrench. This configuration is not essential since as shown in Fig. 6 such configuration is omitted. However, the joint between the two sections 35 is so constructed that the abutting edges of these two sections are tapered as at 37 in Fig. 2 to provide diametrically opposite grooves which can be engaged by a suitable wrench.

The lower end 15 of the elbow casing may be tapered slightly as at 40 in Fig. 6, and a sleeve 41 fits over this tapered section being held thereon by friction. This sleeve 41 is of such length as to extend over the bearing sections 35 when they are in place.

The assembly of the component parts of the attachment member is accomplished in substantially the following fashion: Two bearing sections 35 are placed around the bearing surface 23 of a drive shaft and then this drive shaft is inserted into the elbow casing from the smaller end thereof. The flexible portion passes through the tubular bushing 17 into the enlarged portion 11. The threads 36 on the bearing sections are introduced into the threads 16 and the threaded joint tightened until the shaft is locked in place. In this condition the end of the flexible portion 20 protrudes beyond the end of the enlarged part 11 of the elbow casing. When the shaft has been properly secured to the elbow casing, a sleeve 41 may be inserted over the end of the elbow member and as shown in Fig. 6 this sleeve 41 covers the bearing sections 35 so that the possibility of any abrasive material getting into the bearing is prevented. Both the casing 10 and the sleeve 41 may be knurled at suitable intervals as at 50 to provide a good surface to be gripped by the operator.

When the shaft is in proper position, the attachment may be secured to a customary handpiece by slipping the enlarged portion 11 over the end of the handpiece and at the same time inserting the end 20 of the flexible part of the shaft in the usual chuck of such handpiece. The attachment can then be locked in place in the same fashion that any attachment is secured to the end of a straight handpiece. With the attachment secured to the handpiece, an abrasive disk or other suitable tool may be secured to the rigid end of the shaft by means of the arrangement shown either in Fig. 2 or Fig. 6. Preferably, however, the connection shown in Fig. 6 is used for the reason that when a disk or other device is secured rigidly to the end of the head 24 by a screw 32, all lost play is eliminated.

In this type of device it will be seen that the construction provides an arrangement in which power transmission through an elbow member is accomplished without the use of gearing or other transmitting mechanism in which lost play can occur. Since the end of the flexible shaft is securely fastened to the end of the elbow member by means of the split bearing, any possibility of longitudinal movement of the shaft beyond the end of the elbow casing is precluded. Any lost motion in the shaft will have to be confined to the flexible part of the shaft. The provision of the tubular bushing 17 within the elbow casing assures that the flexible shaft will be aligned properly so that it can be readily inserted in the hand tool chuck when the attachment is secured to the hand tool. This tubular bushing also serves somewhat as an ancilliary bearing. By using this attachment a dentist can reach the most inaccessible parts of a patient's mouth very readily, and due to the lack of lost motion in the driving connections, accurate work, such as the grinding of teeth can be accomplished.

From the foregoing it will be seen that the present invention provides a new type of counterangle attachment for handpieces of utmost simplicity yet of maximum efficiency. It will be apparent, of course, that modifications can be made in the structure all within the contemplation of the invention. With this in view, it is to be understood that any limitations imposed on the invention are not to be confined to the illustrated embodiments but are to be only such as are imposed by the following claims.

I claim:

1. An attachment of the character described comprising a tapered tubular casing bent into elbow form and having one end of such size as to fit on a dental handpiece, a bearing secured to the smaller end of said casing, a drive shaft extending through said casing, said shaft being made up of a solid portion part of which forms a journal rotatably mounted in said bearing and a spring portion extending from the solid portion through said casing into position to be engaged by rotatable portions of a dental handpiece, a bent tubular sleeve within said casing for centering said spring portion, and means for securing instruments to the outer end of said journal.

2. An attachment of the character described comprising a tapered tubular casing bent into elbow form and having one end of such size as to fit on a dental handpiece, a bearing secured to the smaller end of said casing, a drive shaft extending through said casing, said shaft being made up of a solid portion part of which forms a journal rotatably mounted in said bearing and a spring portion extending from the solid portion through said casing into position to be engaged by rotatable portions of a dental handpiece, a bent tubular sleeve within said casing for centering said spring portion, means for securing instruments to the outer end of said journal, and a sleeve fitting over one end of said casing and over said bearing.

JAMES H. BLAIR.